United States Patent Office 3,174,460
Patented Mar. 23, 1965

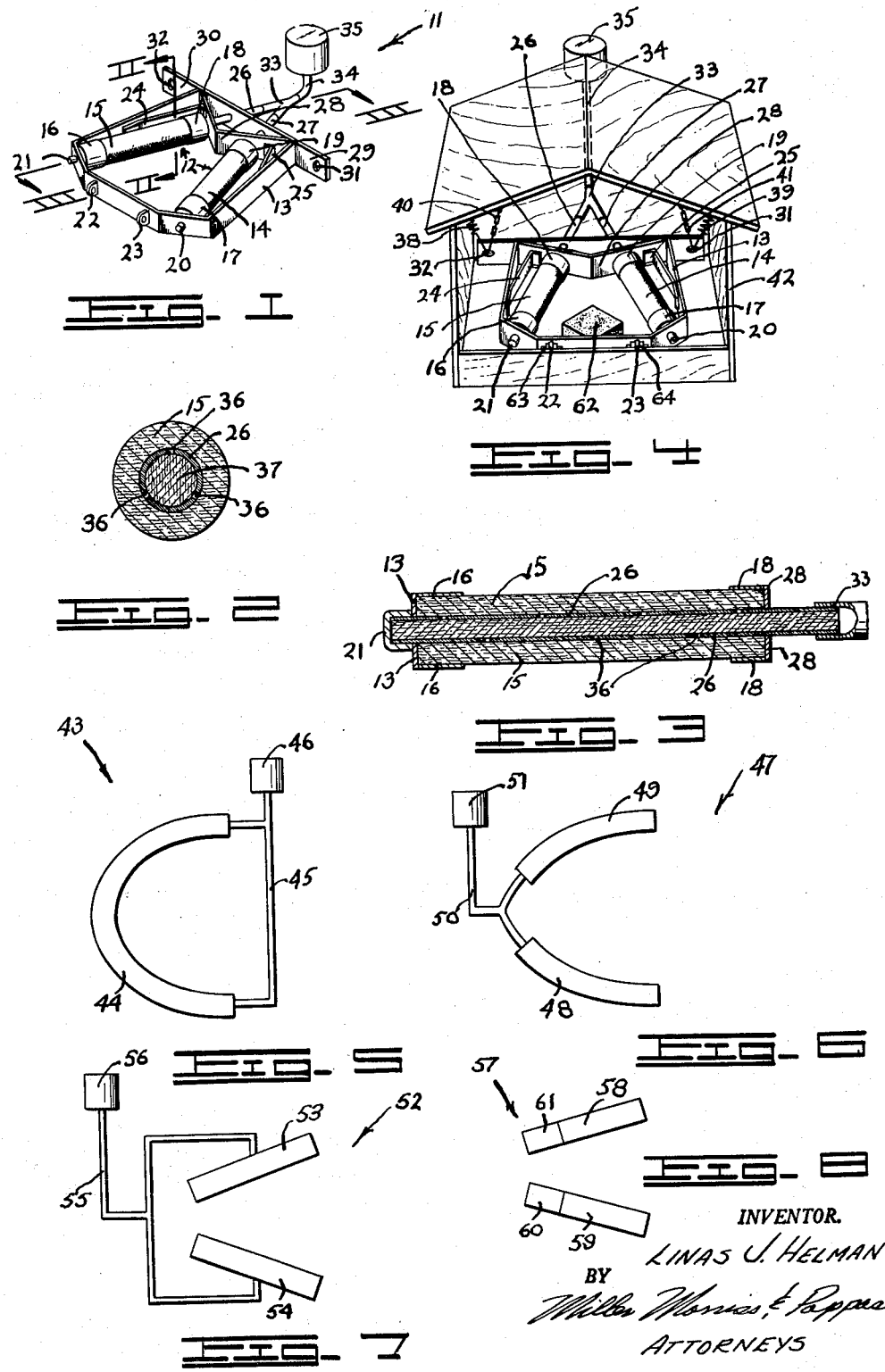

3,174,460
APPLICATOR DEVICES AND MOUNTINGS
Linas J. Helman, R.R. 1, Ithaca, Mich.
Filed Sept. 12, 1962, Ser. No. 223,062
12 Claims. (Cl. 119—157)

This invention relates generally to novel applicator devices useful for applying fluids, such as insecticides and the like, to the head region of four footed animals and more particularly to applicator devices which when suitably mounted provide a means of regularly and repetitively supplying applications of such fluids to the head region of such animals. Further, this invention relates to certain novel dispenser unit combinations useful for applying fluids such as insecticides to the body and head regions of four footed animals.

The prior art has concerned itself with devices useful for applying fluids, in particular insecticides, to the body regions of domestic animals, in particular cattle. While these devices have considerable utility when used for such applications they are not adapted to be used to supply an insecticide to the head region of such animals on a regular and repetitive basis.

There is a great need for devices adapted to apply fluids such as insecticides and the like regularly and repetitively to the head region of four footed animals, including wild and domestic animals, because of the peculiar problems associated with insects which attack the head region of such animals. A particularly troublesome insect is the face fly. This insect can cause considerable irritation to the eye region of such animals. The points of irritation in certain instances develop into severe inflammations. These inflammations can ultimately result in blindness of the animal, if not properly treated. Further, the face fly and other insects when they attack the head region of such animals irritate them and make them difficult to handle. This in turn is reflected in the general decline of the health of the animal thus subjecting the animal to dangerous secondary infections. However, even in view of these problems the prior art has not developed devices which are adapted to regularly and repetitively apply fluids such as insecticides and the like to the head region of four footed animals.

The prior art has further sought to develop dispenser units which are adapted to supply a fluid, in particular an insecticide, at the surface of the dispenser unit without overflow. In the dispenser units of the prior art, for applying insecticides to the body region of such animals, the insecticide is fed to an absorbant wick roll cylinder by means of a rope centered through the roll. This is a suitable means for conveying an insecticide to the roll but it has the disadvantage of allowing too much insecticide to flow to the surface of the roll with the result that it drips from the surface of the roll resulting in a waste of the fluid or insecticide. The prior art has further attempted to provide durable dispenser units for applying insecticides and the like uniformly from application to application. The dispenser units of the prior art for applying insecticides to the body region of such animals have utilized a cylindrical roll which revolves on a rope which conveys the insecticides. Such dispenser units generally accomplish the purpose of uniform application, however, because of considerable friction between the rope and roll, the roll does not revolve easily which decreases the effectiveness. Such dispenser units have the further disadvantage of not being durable enough for continuous hard usage. So far as presently known no such dispenser units have accomplished a selected application of fluids such as insecticides and the like to the head region of animals.

It can thus be seen that there is a need for applicator devices which when suitably mounted can apply fluids such as insecticides and the like to the head region of wild and domestic animals and for individual dispenser unit combinations which conserve the fluid material and which are durable and efficient against rugged service.

It is therefore an object of this invention to provide applicator devices which when mounted are adapted to applying fluids such as insecticides and the like to the head regions of four footed animals.

It is further an object of this invention to provide novel and useful dispenser unit combinations which eliminate the wastage of fluids such as insecticides and the like from the dispenser elements, whether or not in use in the head region of the animals.

Still further it is an object of this invention to provide novel and useful dispenser unit combinations including a rotatable roll or cylinder which is adapted to apply fluids such as insecticides and the like uniformly from application to application by reduction of friction between the roll and its mounting, and which are very durable in service, whether or not in use in the head region of the animals.

Still another object is to provide a simple, easily serviced structure wherein construction, maintenance and installation costs are at a minimum.

These and other objects will become increasingly apparent to those skilled in the art as the description proceeds and by reference to the drawings.

In the drawings:

FIGURE 1 is a perspective view of the preferred form of applicator device illustrating the mounting of dual dispenser units in the shape or form of a V in a frame and spaced so as to engage the head region of an animal and also illustrating the preferred means of supplying a fluid such as an insecticide to the dispenser units by gravity feed in accord with the present invention.

FIGURE 2 is a cross sectional view taken on section line II—II of FIGURE 1 illustrating the cross section of a dispenser unit in the preferred devices constructed in accord with the present invention. The view is drawn to enlarged scale.

FIGURE 3 is a cross sectional view taken on line III—III of FIGURE 1 illustrating a longitudinal center section of a dispenser unit in the preferred devices constructed in accord with the present invention. The view is drawn to an enlarged scale with parts omitted.

FIGURE 4 is a front perspective view of the applicator device illustrated in FIGURE 1 mounted in a housing for use in accord with the present invention illustrating the preferred means of mounting.

FIGURE 5 is reduced perspective view of a dispenser unit and fluid supply means leading to the unit illustrating a single dispenser unit and also illustrating a variation in the connection and type of fluid supply means in accord with the present invention.

FIGURE 6 is a reduced perspective view of dual dispenser units and fluid supply means leading to the units illustrating the dispenser units in the form of a curved V, spaced and configured so as to engage the head region of an animal in accord with the present invention.

FIGURE 7 is a reduced perspective view of dual dispenser units and fluid supply means leading to said units illustrating the side connection of the supply means to the dispenser units in accord with the present invention.

FIGURE 8 is a reduced perspective view of dual dispenser units and supply means leading to said units illustrating their integral combination and forming a replaceable unit in accord with the present invention.

General description

In general the applicator devices of this invention are constructed such that they provide a surface which engages the head region of a four footed animal in operation. The preferred applicator devices of this invention are comprised of a fluid supply means in combination with at least one dispenser unit mounted on a frame which when suitably mounted will engage the head region of the animal to supply a dosage of an insecticide or fluid. The dispenser unit or units in the applicator device are generally mounted over a suitable edible substance or bait to provide an inducement for the animal to rub its head on the dispenser unit or units. The dispenser unit or units can be constructed in various forms such that they can selectively apply an insecticide or fluid to the head region of a four footed animal. In the preferred insecticide applicator devices of this invention the dual mounted dispenser units are formed or configured such that the head regions of the animals are contacted when the animal inserts its head between the applicator units. In the preferred mounting of the applicator devices of this invention they are hinged or pivoted at the facial entry side and spring mounted at the opposite side.

In the preferred applicator devices of this invention the fluid supply means feeds the dispenser unit or units by means of gravity through tubes provided through the center of a wick roll cylinder; however, any means of supplying the insecticide or fluid to the cylinders or a fluid dispenser surface is suitable.

It is preferred to construct the individual dispenser units such that a tube having passages on its surface mounts a wick roll cylinder over the passages. The tube contains a relatively tight fitting rope which distributes the insecticide or fluid to the holes in the tube and thus to the cylinder. Further it is preferred to provide end retainers at the ends of the wick roll cylinder such that the wick roll cylinder will revolve on the tube and remain in position. It will be appreciated that these are preferred forms of construction of a dispenser unit and that all that is necessary is that a surface or cylinder be provided with an insecticide or fluid and be positioned such that it will contact the head region of a four footed animal.

It will be appreciated that the preferred form of dispensing the insecticide or fluid to the head region of the four footed animals is by means of dual dispenser units which are arranged so as to peripherally frame an opening, the inside margins of which register dimensionally for engagement with the head characteristics of the animal served.

It is to be appreciated that the applicator devices constructed in accord with the present invention are adapted to dispensing any fluid which needs to be regularly and repetitively applied to the head region of an animal such as for instance medicines of various types. However, they are most used for dispensing an insecticide material and thus the following description will be confined to insecticide materials.

*Specific description*

The preferred applicator device 11 is illustrated in FIGURE 1. In general, a pair of dispenser units 12 having facial engaging surfaces are mounted in a frame 13. The dispensing units 12 are connected by tube 34 and Y connector 33 to an insecticide supply means or tank 35. The applicator device 11 is suitably mounted such that it is in a somewhat horizontal plane.

FIGURES 1, 2 and 3 illustrate the preferred construction of the dual dispenser units 12. Referring to FIGURE 1, wick roll cylinders 14 and 15 are mounted concentrically around feeder tubes 26 and 27. The cylinders 14 and 15 are freely rotatable on the feeder tubes 26 and 27. The roll cylinders 14 and 15 are axially positioned and retained at their ends by end retainers 16, 17, 18 and 19, the frame 13 and a roll retainer 28. The retainers 16 and 17 are secured to the frame 13 as by welding. The roll retainer 28 secures the end retainers 18 and 19 and the roll retainer 28 is secured to the frame 13. The roll retainer 28 is further secured by braces 24 and 25 fastened to the roll retainer 28 and the frame 13. It will thus be appreciated that the roll retainer 28 and the frame 13 provide dual parallel plane surfaces through which the projected axis of the cylinders 14 and 15 pass. Along the projected axis of the cylinders 14 and 15 the feeder tubes 26 and 27 are mounted. Thus, the tubes 26 and 27 pass through frame 13 and the roll retainer 28. The tubes 26 and 27 and end retainers 16, 17, 18 and 19 are positioned in the frame 13 such that they form a V configuration. The point of apex section of the V so formed by tubes 26 and 27 is supported by the roll retainer 28 and frame 13. The diverging ends of tubes 26 and 27 pass through the frame 13. Cap plugs 20 and 21 are secured to the tubes 26 and 27, as by threading on the outside of and after the tubes 26 and 27 pass through the frame 13. The converging ends of tubes 26 and 27 pass through the roll retainer 28 and frame 13 and at their point of convergence are connected by a Y connector 33. A flexible tube 34 leads to an insecticide supply means or tank 35 from the Y connector 33. Thus, the dual dispenser units 12 are connected by the Y connector 33 through the flexible tube 34 to the insecticide supply means or tank 35. It will be appreciated that it is preferred that the tubes 26 and 27 be threaded into the Y connector 33. This permits removal of the tubes 26 and 27 so that the wick roll cylinders 14 and 15 may be replaced. However, it will be appreciated that the tubes 26 and 27 and the Y connector 33 can be integral units. It is preferred that the end retainers 18 and 19 be secured to the roll retainer 28; however, it will be appreciated that the end retainers 16 and 17 at the other end of the cylinders 14 and 15, fastened to the frame 13 and the roll retainer 28 will provide sufficient support for positioned rotation of the cylinders 14 and 15 on the tubes 26 and 27. The cylinders 14 and 15 can be reinforced at their ends by steel bands or the like replacing the end retainers 18 and 19 for instance. It will further be appreciated that the applicator units 12 be constructed such that they are removable from the frame 13 by providing joints on the tubes 26 and 27. Thus, for instance, the cylinders 14 and 15, end retainers 16, 17, 18 and 19 mounted on said tubes 26 and 27 and portions of the tubes 26 and 27 could be adapted to a replaceable unit.

FIGURES 2 and 3 illustrate the detailed construction of the left hand applicator unit 12. The right hand applicator unit 12 is identical. The feeder tube 26 rotatably supports the wick roll cylinder 15. It is preferred that the tube 26 be constructed of steel. It is preferred that the cylinder 15 be constructed of a burlap or cotton material covered with a heavy canvas material. The tube 26 has holes or passages 36 along its surface between its central chamber and the inside of the cylinder 15. Inside the tube 26 is a relatively securely fitting wick rope 37. Thus, the insecticide passes through wick rope 37 and at various points along the tube 26 passes through the holes 36 to the inside surface of the cylinder 15. The roll or cylinder 15 is made of an absorbent material so that the insecticide material can pass to its outer surface. It has been found that the combination of wick rope 37, tube 26 and cylinder 15 provides a means of dispensing the insecticide material to the upper surface of the roll 15 against the force of gravity when the applicator unit 12 is positioned in a relatively horizontal position. It was found that this combination has the further advantage of dispensing the insecticide material at a uniform rate and amount over the entire surface of the roll or cylinder 15. Further, it was found that the combination dispensed the insecticide material to the surface of the roll 15 without an excess of insecticide material which would drip from the surface of the roll 15.

The wick roll cylinder 15 is positioned by means of end retainers 16 and 18 which are attached to the frame 13 and the roll retainer 28. The end retainers 16 and 18 are cylindrical metal sheets which are axially mounted over the surfaces of the cylinder 15. The combination of end retainers 16 and 18 with the frame 13 and roll retainer 28 provide a means for positioning the cylinder 15, such that it will rotate on the feeder tube 26. Thus, when the animal engages the surface of the roll 15 with its head region the roll 15 will revolve on the tube 26. Thus, this preferred construction allows the cylinder 15 to present a continuously wetted or saturated surface to the head region of the animal. It has been found that this preferred construction results in decrease in wear of the surface of the cylinder 15. It further has been found that this construction provides a durable dispenser unit which is not destroyed by animal abuse.

The frame 13; tubes 26 and 27; Y connector 33; end retainers 16, 17, 18 and 19; roll retainer 28; braces 24 and 25 and cap plugs 20 and 21 may be constructed of any durable material. However, it is preferred to use steel for maximum useful life under rugged service conditions. The wick roll cylinders 14 and 15 may be constructed of a material which will dispense an insecticide material at its surface however, a burlap material wrapped with a canvas cover is preferred. The wick rope 37 may be of any braided material which will provide a constant amount of insecticide to the roll cylinders 14 and 15; however, manila rope of the approximate diameter of the feeder tubes 26 and 27 is preferred. It will be appreciated that there are a large number of materials of construction and their selection will depend upon factors such as cost and animal usage in service. With animals such as cattle, it is preferred to use extremely durable materials because of rough service usage.

FIGURES 1 and 4 illustrate the applicator device 11 and the preferred mounting of the applicator device 11 in its operative setting. The section of the frame 13 which supports the point or apex section of the applicator units 12 has two lateral projections 29 and 30. At the ends of these lateral projections 29 and 30 holes 31 and 32 are provided. At the opposite end of the frame 13 hinge or pivot points 22 and 23 are provided. The applicator device 11 is mounted in the housing 42 as shown in FIGURE 4. The housing 42 has a front opening. This is the head entry side. At this head entry side the hinge or pivot points 22 and 23 are rotatably connected to the hinge or pivot points 63 and 64 which are secured to the housing 42. The integral projections 29 and 30 of the applicator device 11 are suspended by means of springs 38 and 39 attached to the housing 42 and the holes 31 and 32. The springs 38 and 39 are mounted on the housing 42 such that the applicator device 11 inclines upward at an angle of about 45° from the horizontal. Thus, when the animal inserts its head between the dispenser units 12 it will depress the applicator device 11. The springs 38 and 39 provide a means of reciprocably moving the dispenser units 12 over the head region of the animal because of automatic spring action. This provides a more positive means of dispensing the insecticide to the head region of the animal. Chain retainers 40 and 41 are attached to the rear portion of the housing 42 and to the holes 31 and 32 and are of sufficient length to prevent the animal from depressing the suspended portion of the applicator device 11 too far or pulling it upward out of the housing. The insecticide supply means or tank 35 is mounted on the outside of the housing 42 and the flexible tubing 34 leads downward into the inside of the housing 42. The flexible tube 34 is attached by means of the Y connector 33 to the applicator units 12. Thus, when the applicator device 11 is depressed, the flexible tubing 34 permits the downward motion. The chain retainers 40 and 41 prevent this downward motion from tearing the flexible tube 34 from the Y connector 33. There are numerous means of suspending and retaining the dual dispenser unit 12 portion of the applicator device 11 and all are within the scope of the present invention. Further, there are various rigid support means which are adapted to mounting the dual dispenser unit 12 portion of the applicator device 11.

The resulting mounted applicator device 11 as illustrated in FIGURE 4 is provided with an attraction for the animals such as a salt lick 62 disposed below the dual dispenser unit 12 portion of the applicator device 11. Thus, the animal is induced to insert its head between the applicator units 12 to reach the salt lick 62 and thereby receives an application of the insecticide from the surface of the wick roll cylinders 14 and 15.

FIGURES 1 through 4 illustrate the construction of the preferred applicator device 11 and mounting and dispenser unit 12 combinations in combinations in accord with the present invention. However, there are numerous modifications that are within the scope of the present invention. FIGURES 5 through 8 illustrate various modifications of dispenser units and insecticide supply means attachment and type.

FIGURE 5 illustrates an integral dispenser unit 43 connected to an insecticide supply means 46. The insecticide supply means 46 is connected to the dispenser unit 43 by means of feeder tubes 45. In this modification the dispenser unit 43 is a single integral unit. This dispenser unit 43 may be substituted for the dispenser units 12 shown in FIGURE 1 and provided with suitable mounting means. The dispenser unit 43 is provided with a single integral wick roll cylinder 44. The dispenser unit 43 has the advantage of being adaptable to the configuration of the head region of the animal served. The insecticide supply means 46 in this unit is attached at the ends of the cylinder 44 by means of the tubes 45. The insecticide supply means 46 is provided with pressure so that the insecticide will flow to the cylinder 44 by means of the tubes 45. Thus, insecticide supply means 46 can be in the same plane as the dispenser unit 45 since it does not feed by gravity. This insecticide supply means 46 could be substituted in the applicator device 11 shown in FIGURE 1 for the gravity feeding insecticide supply means or tank 35 there shown. The construction of the dispenser unit 43 can be similar to that shown in FIGURES 1–3.

FIGURE 6 illustrates a pair of dispenser units 47. Each of the dispenser units 47 has curved wick rolls 48 and 49. These cylinders 48 and 49 are adaptable to the configuration of the head of the animal served. The dispenser units 47 are adapted to be substituted for the dispenser units 12 shown in FIGURE 1. The insecticide is supplied to the dispenser units 47 by means of the tube 50 receiving an insecticide from a gravity feed insecticide supply means or tank 51. The tube 15 may be flexible or rigid depending upon the mounting of the applicator units 47. The construction of the units 47 can be similar to that shown in FIGURES 1–3.

FIGURE 7 illustrates another means of dispensing an insecticide to dual dispenser units 52. The dispenser units 52 are comprised of wick roll cylinders 53 and 54 positioned in the form of a V. The insecticide supply means 56 feeds the insecticide material by gravity through the tube 55 through the sides of the dispenser units 52. This construction provides another means of mounting the dispenser units 52 and the connection of the tubes 55 with the dispenser units 52 at the side and may be fixed or rotatably connected depending upon the application. The dispenser units 52 are suitably mounted depending upon the application. The construction of the dispenser units 52 can be similar to that shown in FIGURES 1–3.

FIGURE 8 illustrates the integral combination of insecticide supply means 60 and 61 with dual applicator units 57. The combinations are suitably mounted to form a configuration which will apply an insecticide to the head region of an animal. The dispenser units 57 are constructed of cylindrical wick roll cylinders 58 and 59 attached directly to the insecticide supply means 60 and 61. The integral dispenser units 57 provide a means for constructing replaceable combinations, for instance the insecticide supply means 61 and wick roll cylinder 58. The construction of the dispenser units 57 can be similar to that shown in FIGURES 1–3.

As can be seen from FIGURES 1 through 8 there are many types of dispenser unit or units in combination with various insecticide supply means. The insecticide can be supplied directly to the wick roll cylinders by means of drip application or by means of a surface of the wick roll cylinder being placed in a supply of the insecticide material, rather than a tube connection. However, it will be appreciated that this is not the preferred means. As long as the wick roll cylinder has a supply of an insecticide material at its surface and is configured or formed to apply an insecticide to the head region of an animal it is within the scope of the present invention. Further, as long as there is a surface presented which has a supply of an insecticide material it need not be of the wick roll cylinder type.

The support means for the dispenser units or insecticide dispensing surface can be of any conventional type. In the mounted applicator device 11 illustrated in FIGURE 6 the housing 42, chain retainers 40 and 41, the pivots or hinge points 22, 23, 62 and 64 and springs 38 and 39 can be eliminated and any suitable support means provided. However, it will be appreciated that FIGURE 6 illustrates the preferred mounting of applicator devices in accord with the present invention. Further, the frame 13 illustrated in FIGURES 1 and 6 can be modified or eliminated and other support means provided for the dispenser unit or units. It will be appreciated that it is preferred to use a frame such as the frame 13 in the preferred applicator devices 11 constructed in accord with the present invention. It will be appreciated that the housing 42 is preferred so as to avoid animal inspired destruction and to protect the dispenser units or insecticide dispensing surface from the elements.

In the applicator device 11 illustrated in FIGURE 1, the tube 34 is flexible because of the means of support of the applicator device 11. However, where the support means does not provide the dispenser units or insecticide dispensing surfaces with spring suspension or where the supply means is not attached to the housing, the tubing may be rigid. However, it will be appreciated that in the preferred devices constructed in accord with the present invention, the insecticide supply means or tank 42 is mounted above the dispenser units 12 so that it will feed the dispenser units 12 by gravity.

It will be appreciated that the dispenser units or insecticide dispensing surfaces may be mounted in sequence. Thus, for instance, the dispenser unit 12 illustrated in FIGURES 1–4 may function as an animal engaging surface on both sides at once. In this instance, the frame mounting need not be spring and pivot or hinge mounted.

*Operation*

In operation, the mounted applicator devices of this invention are adapted to applying an insecticide to the head region of a four footed animal. What is required is an insecticide dispensing surface or unit which is positioned and configured such that the animal receives a dosage of insecticide on its head region.

In the preferred embodiment of this invention illustrated in FIGURES 1–4 the dispenser unit portion of the applicator device is depressed by the head of the animal. The chain retainers restrict the movement of the applicator device. Upon removal of the head of the animal the springs or resilient means return the applicator device to its rest position. The chain retainers further prevent the animal from lifting the applicator device from the housing.

In the preferred devices constructed in accord with the present invention the insecticide is fed by gravity to dispenser unit or units. The central tube of the dispenser unit contains a relatively tight fittting rope wick which controls the flow of the insecticide inside the tube. The tube has radially extending holes or passages along its surface which supply the insecticide to the inside surface of the cylinders. The insecticide then migrates to the surface of the cylinders. This combination has the advantage of supplying the insecticide uniformly over the outer surface of the cylinders and against the force of gravity. Further, in the preferred devices constructed in accordance with the present inventor the dispenser unit is constructed such that the cylinder is adapted to rotate on the tube. This provides a means of continuously supplying a surface which is saturated with insecticide or has a fresh supply of insecticide after depletion of insecticide at one point. Further, the combination is extremely durable.

The choice of type of insecticide supply means is easily made according to the choice of dispenser unit. Thus, in the preferred devices constructed in accord with the present invention, the insecticide supply means or tank feeds the dispenser unit or units by means of gravity. This construction provides a simple and reliable means of supplying an insecticide to the dispenser unit or units. However, it will be appreciated that there are numerous other insecticide supply means which are adapted to supply an insecticide material to a cylinder or animal facial engaging surface.

It is preferred to use a salt lick disposed at a point opposite the facial entry point of the dispenser unit or units or insecticide applying surface to provide a stimulus for the animal to insert his head. However, any stimulus is suitable. Foods or baits of various types can be used. With certain animals the repeated use of the mounted devices of this invention may be a matter of habit because of the relief obtained rather than because of any specific stimulus.

While the foregoing is a specific description of this invention and those skilled in the art will preceive improvements, refinements and modifications, it is intended that such improvements and modifications be included in the spirit of the present invention and it is intended that this invention be limited only by the scope of the hereinafter appended claims.

I claim:

1. In an applicator device the combination which comprises:
   (*a*) dual fluid dispensing wick roll cylinders coplanarly positioned to form a V and spaced to apply a fluid to the head region including substantially simultaneously to both eye regions of a four footed animal;
   (*b*) dual tubular members having passages for conveying the fluid to said cylinders and providing support for said cylinders by passing through the longitudinal center of said cylinders; and
   (*c*) fluid supply means connected to said tubular members.

2. In an applicator device the combination which comprises:
   (*a*) dual fluid dispensing wick roll cylinders coplanarly positioned to form a V and spaced to apply a fluid to the head region including substantially simulanteously to both eye regions of a four footed animal;
   (*b*) dual tubular members having passages for conveying the fliud to said cylinders and providing support for said cylinders by passing through the longitudinal center of said cylinders;
   (*c*) wick ropes which are approximately the same diameter as the tubular members positioned inside said tubular members; and
   (*d*) insecticide supply means mounted to supply the fluid through said tubular members and through said wick rope by means of gravity.

3. A mounted fluid applicator device which comprises:
   (*a*) horizontally oriented frame having a head entry end;
   (*b*) dual fluid feeder tubes mounted on said frame in the form of a V having an open end and an apex end with the apex end of the V being opposite the head entry end of the frame;

(c) a fluid supply means connected by a conducting tube to said dual feeder tubes;

(d) dual wick roll cylinders mounted around said feeder tubes; and (e) support means mounting said frame.

4. The device of claim 3 wherein said support means comprises a housing mounting hinging means mounted on the head entry end of said frame and at the open end of the V and resilient means mounted on the opposite end of said frame and at the apex end of the V and wherein said conducting tube is flexible.

5. The device of claim 4 wherein retaining means is provided at the apex end of the V and attached to said frame and said housing to restrict the movement of said frame to an angle of 45° in either direction from the rest position, said frame having its rest position at an angle of about 45 degrees and inclined toward the apex end of the V.

6. A mounted applicator device which comprises:

(a) dual dispenser units for fluids each with cylindrical surfaces energizable by the head region of a four-footed animal, positioned to form a V with converging legs and configured and spaced to apply a fluid to the head region, including substantially simultaneously to both eye regions, of a four-footed animal, the cylindrical surfaces being rotatable when energized by the head region of the four-footed animal and whereby in use of the applicator device the head region of the animal is directed towards the converging legs of the V of the dispenser units such that the fluid is applied substantially simultaneously to both eye regions;

(b) fluid supply means for supplying fluid to the cylindrical surfaces of the dispenser units; and (c) support means mounting the dispenser units.

7. A mounted applicator device which comprises:

(a) support means mounting at least one dispenser unit for fluids defining surfaces with coplanar zones configured to apply a fluid to the head region including substantially simultaneously to both eye regions of a four-footed animal, wherein said support means is a frame mounted and horizontally oriented in a housing with an opening for head entry on one side, the frame being positioned in the housing such that both sides of the head region of the animal can engage the dispenser unit through the opening for head entry and wherein said frame is pivotally mounted in and attached to said housing by resilient means on a portion of the frame opposite the head entry opening and hinging means on portions of the frame adjacent to head entry opening; and (b) supply means for dispensing the fluid to said dispenser unit.

8. The device of claim 7 wherein dual dispenser units are coplanarly positioned in the frame in the form of a V with an apex end inclined at an angle with respect to the horizontal rising upwardly towards the apex of the V with the apex end opposite the head entry opening.

9. The device of claim 8 wherein said supply means is connected by means of flexible tubing to the dual dispenser units and is positioned on the housing above the dispenser units so that it feeds by gravity.

10. The device of claim 9 wherein said dual dispenser units are comprised of two tubes having passages through their sides coplanarly positioned in the form of a V with a convergence point and dual wick roll cylinders mounted over said passages on said tubes, said tubes being mounted on said frame and being connected by the flexible tubing at the convergence point with the fluid supply means.

11. A dispenser unit for applying fluids to an animal which comprises:

(a) a wick roll cylinder;

(b) a rigid feeder tube having a central chamber rotatably mounting said cylinder and having passages between the central chamber thereof and an inside surface of the cylinder; and (c) a rope wick inside said tube which is approximately the same diameter as the inside diameter of said tube and substantially filling the same, such that the fluid can be supplied under pressure through the rope wick and the central chamber of the feeder tube and the passages to the wick roll cylinder.

12. In an applicator device the combination which comprises:

(a) dual cylindrical dispenser units for fluids energizable by the head region of a four-footed animal, positioned to form a V with converging legs and configured and spaced to apply a fluid to the head region, including substantially simultaneously to both eye regions, of a four-footed animal, the cylindrical dispenser units being rotatable when energized by the head region of the four-footed animal whereby in use the head region of the animal is directed towards the converging legs of the V such that the fluid is applied substantially simultaneously to both eye regions;

(b) dual tubular members having passages for conveying the fluid to the dispenser units and providing support for said dispenser units by passing through the longitudinal centers of said dispenser units; and (c) fluid supply means connected to said tubular members.

References Cited by the Examiner
UNITED STATES PATENTS

| | | | |
|---|---|---|---|
| 866,523 | 9/07 | Schneider | 119—157 |
| 1,045,129 | 11/12 | Donathan | 119—157 |
| 1,237,784 | 8/17 | Hurff | 119—157 |
| 1,921,901 | 8/33 | Anderson. | |
| 2,765,775 | 10/56 | Kramer | 119—157 |
| 2,777,421 | 1/57 | Hiebert | 119—157 |

SAMUEL KOREN, *Primary Examiner.*

CARL W. ROBINSON, HUGH R. CHAMBLEE,
*Examiners.*